United States Patent
Soubitez

[11] 3,830,271
[45] Aug. 20, 1974

[54] DEVICE FOR FIXING A SHAFT TO A MEMBER

[76] Inventor: Pierre Soubitez, 3 Bis, Rue chanz, 94 Le Perreux, France

[22] Filed: July 24, 1972

[21] Appl. No.: 274,283

[52] U.S. Cl.................. 151/28, 403/282, 403/359, 403/320
[51] Int. Cl............................................ F16b 39/02
[58] Field of Search........... 151/28, 27, 30, 23, 2 R, 151/2 A, 28; 403/320

[56] References Cited
UNITED STATES PATENTS

| | | | |
|---|---|---|---|
| 85,381 | 12/1868 | Hamilton | 151/23 |
| 435,079 | 8/1890 | Swan | 151/28 |
| 490,557 | 1/1893 | Grafflin | 151/28 |
| 580,340 | 4/1897 | Buell | 151/28 |
| 2,397,111 | 3/1946 | Huck | 85/72 |
| 3,459,447 | 8/1969 | Hund et al. | 151/30 |
| 3,727,254 | 4/1973 | Tildesley | 151/41.73 |

FOREIGN PATENTS OR APPLICATIONS

| | | | |
|---|---|---|---|
| 560,838 | 4/1944 | Great Britain | 151/30 |
| 229,675 | 2/1944 | Switzerland | 151/28 |

Primary Examiner—Edward C. Allen
Attorney, Agent, or Firm—Holman & Stern

[57] ABSTRACT

The device is adapted to fix a shaft to a member which is provided with a bore for the shaft and a tapped aperture which is engaged with a screwthreaded portion on the shaft. The device comprises a cap which is integral with the member at one end of the bore, longitudinal splines on the shaft engaged with the inner wall of the cap and teeth formed by an extension of the tapped aperture of the member engaged with the outer wall of the cap.

3 Claims, 3 Drawing Figures

PATENTED AUG 20 1974 3,830,271

DEVICE FOR FIXING A SHAFT TO A MEMBER

The present invention relates to a device for achieving a fixed assembly between a shaft and a member mounted on the shaft and more particularly for fixing a drive member to a shaft which the member has to drive.

It is indeed frequent to interconnect a shaft and a member mounted on the shaft by screwing these two parts together. However, such screwing does not ensure a definite fixing and it is necessary to employ a lock-nut which is screwed on the shaft to lock the member in position and thus prevent any relative axial or rotational movement of the shaft and member. In this case, the two parts are effectively fixed together. Unfortunately, the clamping effect of the lock-nut usually results in a slight displacement of the member and this is a serious drawback when the latter must have a precise position on the shaft since this position is affected by the action of the lock-nut.

This is a serious disadvantage, in particular in the case of the fixing of a drive roller on the shaft of the electric generator of dynamo of a bicycle. Inded, the position of this roller usually ensures the adjustment of the ball bearings supporting the shaft and when the tightening of the lock-nut affects this adjustment the bearings undergo additional stress.

An object of the present invention is to overcome these drawbacks by providing a fixing device which in no way modifies the relative position of the two parts and prevents any displacement therebetween.

The invention provides a device for fixing a shaft to a member provided with a bore for the shaft, said device comprising between the two parts longitudinal splines for preventing relative rotation of the parts and carried by at least one of the parts and peripheral teeth carried by the other of the parts.

In a first embodiment of the invention, the device for fixing a shaft to a member having a bore for the shaft and a tapped aperture engaged with a screwthreaded portion of the shaft comprises a cap integral with the member at the end of the bore, longitudinal splines on the shaft engaged with an inner wall of the cap and teeth formed on an extension of the tapped aperture of the member engaged with the outer wall of the cap.

Preferably, the cap is moulded in one piece with the member and connected to the latter by tab portions which are broken when the cap is forced into the bore.

The member and the shaft are thus interlocked by the cap which is in intimate contact with each part. Any movement of the member alone is prevented by the contact between the teeth and the cap which is fixed to the shaft by the splines.

According to another embodiment of the invention, the device for fixing a shaft to a member provided with a bore for the shaft comprises longitudinal splines which are formed in the wall of the bore, circular teeth formed on the shaft and longitudinal splines evenly spaced apart of the periphery of the shaft and arranged perpendicular to the teeth, the teeth and splines being engaged with each other.

The contact of the teeth of the shaft with the wall of the bore of the member prevents any relative axial movement of the two parts and the contact of the splines of the shaft with those of the bore immediately block any movement of rotation between the parts.

Irrespective of the embodiment chosen, the member is placed in position on the shaft and held perfectly fast thereto without any screwing or other operation which might cause a displacement between the shaft and the member and thus modify this relative position.

The ensuing description of one embodiment of invention given by way of example to which the invention is not intended to be limited will show the advantages and features of the invention.

Figure 1:
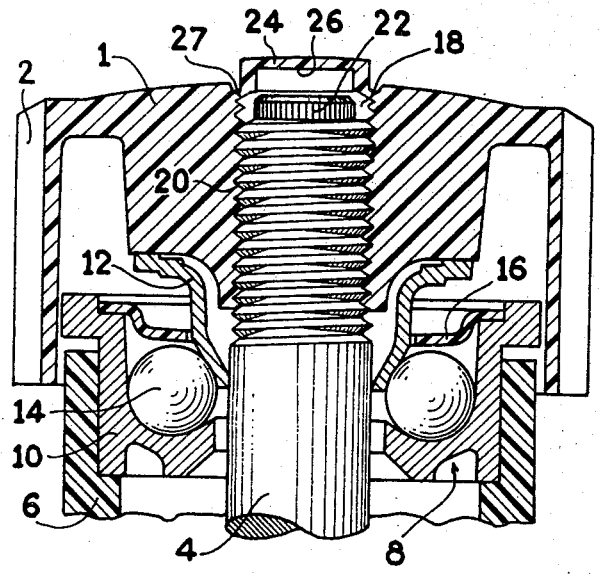
FIG. 1 is a longitudinal sectional view of a device for fixing a drive roller on the shaft of a dynamo or generator before these parts are locked in position.

In the drawings a roller 1 of plastics material or the like provided with outer longitudinal teeth 2 adapted for example to engage the tyre of a bicycle, is mounted on a shaft 4 connected to an electric current generator or dynamo (not shown). This shaft 4 is coaxial with a support tube 6 supported inside the tube by ball bearings. The illustrated ball bearing 8 is located in the vicinity of the end of the shaft engaged in the roller and comprises an outer ring 10 acting as a race for the balls 14 and fixed in the tube 6, and a substantially frustoconical inner ring 12 whose small end portion if fixed around the shaft 4 and which is in contact with the balls 14. A flexible washer 16 carried by the ring 10 closes the bearing between the ring 10 and the ring 12 and prevents the balls 14 from moving out of the bearing. When the roller 1 is mounted on the shaft 4 it bears against the large end portion of the ring 12 which is thus forced against the balls to an extent depending on the position of the roller on the shaft.

Figure 2:
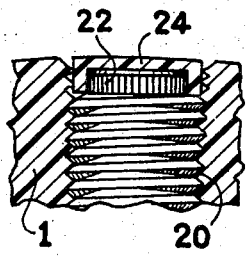
FIG. 2 is a partial sectional view of the device after the parts have been locked in position.

In the embodiment shown in FIGS. 1 and 2, the roller 1 comprises a central tapped bore 18 which is adapted to be screwed on a corresponding screwthreaded portion 20 of the shaft 4, the tapped portion being extended up to the end of the bore beyond the shaft 4. The latter is extended beyond the screwthreaded portion 20 by a portion 22 of smaller diameter provided with outer longitudinal splines. Further, the roller 1 is integral with a cap 24 defining a cylindrical inner cavity 26 whose diameter is substantially equal to that of the roots of the splines of the extension 22 of the shaft.

The outer surface of the cap 24 has preferably a prismatic shape and is connected to the roller 1 by tab portions 27 of very small section.

This cap is preferably moulded in one piece with the roller 1 so that when the latter is placed in position on the shaft 4, it constitutes means for closing the bore 18 but extends beyond the end of the roller 1 as shown in FIG. 1.

When the roller is screwed on the shaft 4 and occupies exactly the required position for ensuring that the bearing 8 is held in place and that the ring 12 is in contact with the balls 14, the cap 24 is driven between the tapped portion of the roller and the extension 22 of the shaft as shown in FIG. 2.

The dimensions of this cap are such that the diagonals of the polygon of the base of the prism defined by its outer surface are slightly longer than the inside diameter of the tapped portion but shorter than the diameter of the roots of the threads of the tapping. Thus the outer surface of the cap is in very close contact with the teeth of the tapped portion and its inner cavity is fitted on the splines of the extension 22. The cap is consequently held stationary with respect both to the roller and to the shaft and this roller is prevented from moving with respect to the shaft 4. A relative displacement between the roller and shaft is only possible by breaking the cap 24.

This fixed connection moreover occurs exactly in the desired position, since after the adjustment of the roller, the mere driving in of the cap is not liable to modify the position of the roller. The axial force exerted at the same time on the two parts prevents any relative rotation thereof and consequently any relative axial displacement.

Figure 3:
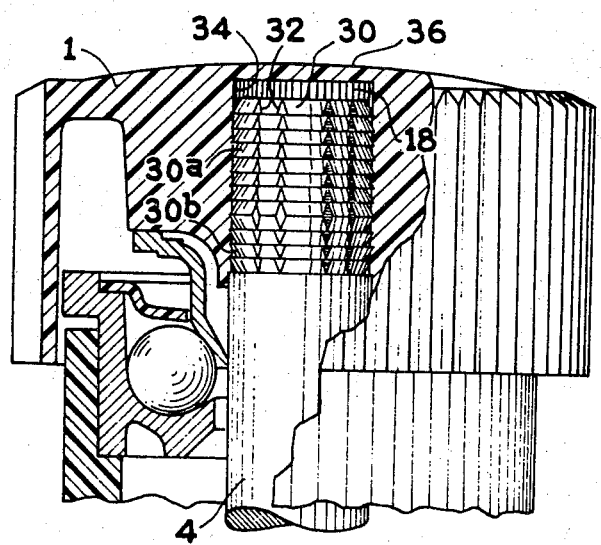
FIG. 3 is a side elevational view, partly cut away, of a modification of the device according to the invention.

In a modification of the invention shown in FIG. 3, the shaft 4, which is mounted in the way described hereinbefore in the tube 6 through the agency of a ball bearing 8, is not screwthreaded but has at its outer end annular teeth 30 which are preferably arranged in two groups of teeth 30a and 30b the profiles of which face in opposite directions, these groups being in axially adjoining relation on the shaft. Longitudinal splines 32 cut across these teeth at regular intervals.

Formed in the wall of the bore 18 of the roller are longitudinal splines 34 which are adapted to co-operate with the teeth 30 and the splines 32 when the roller is forced onto the shaft 4.

The dimensions of the teeth and splines are so chosen that the teeth very slightly penetrate the material of the roller 1. These teeth have therefore an outside diameter slightly greater than the minimum diameter of the splines 34 of the bore and the latter engage the splines 32 of the shaft. Thus the annular teeth 30 preclude any relative longitudinal displacement of the shaft and roller and the splines 32 co-operating with the splines 34 prevent these two parts from rotating with respect to each other. No relative movement can occur without danger of harming the roller of the shaft and consequently these two shafts are ridigly interconnected without intervention of any additional means.

Preferably the bore 18 is closed at the outer end of the roller by a cap 36 which is an extension of the material of the roller 1, this cap preventing any spreading apart of the walls of the bore when the shaft 4 is forced into the roller and limiting the penetration of the shaft. It will be understood that this cap is moulded in one piece with the roller.

In this embodiment, the adjustment of the position of the roller with respect to the bearing 8 is carried out at the same time as the fixing of the two parts by regulating the depth to which the shaft is forced into the roller. The assembly thus achieved cannot be interfered with and, as in the case of the embodiment shown in FIGS. 1 and 2, any accidental movement of the roller with respect to the shaft is impossible.

Although the illustrated embodiments concern essentially the fixing of a roller on a shaft of a generator or dynamo, it must be understood that the invention is equally applicable to the driving of other rotating machines and to the fixing together of other members.

Having now described my invention what I claim as new and desire to secure by Letters Patent is:

1. A device for fixing a first element comprising a shaft having a screwthreaded portion to a second element comprising a member provided with a tapped aperture engaged with the screwthreaded portion of the shaft, said device comprising an extension having longitudinal splines, provided at one end of the screwthreaded portion of said shaft, said extension being adjacent to one end of said tapped aperture and a cap having an inner wall and an outer wall, said cap being integral with said member at said one end of the tapped aperture and being separable from said member, the longitudinal splines of the shaft extension being engaged with the inner wall of the cap and said one end of the tapped aperture adjacent to said extension being engaged with the outer wall of the cap after separation thereof from said member.

2. A device as claimed in claim 1, wherein the cap has a prismatic shape and defines a cylindrical inner cavity whose diameter is slightly less than the diameter of said shaft extension having longitudinal splines, the outside dimension of the cap being very slightly greater than the inner diameter of the tapped aperture.

3. A device as claimed in claim 1, wherein the cap is moulded in one piece with the member and forms an extension of the tapped aperture of the member, tab portions connecting the cap to the member, the tab portions being of very small section and capable of breaking when the cap is forced between the shaft and the tapped aperture.

* * * * *

UNITED STATES PATENT OFFICE
CERTIFICATE OF CORRECTION

Patent No. 3830271             Dated August 20, 1974

Inventor(s) Pierre Soubitz

It is certified that error appears in the above-identified patent and that said Letters Patent are hereby corrected as shown below:

[30]  Foreign Priority Data:

France No. 71-26-881 July 22, 1971

Signed and sealed this 21st day of January 1975.

(SEAL)
Attest:

McCOY M. GIBSON JR.                    C. MARSHALL DANN
Attesting Officer                      Commissioner of Patents